United States Patent [19]

Fairbairn et al.

[11] 4,050,289

[45] Sept. 27, 1977

[54] METHOD FOR TEMPERATURE CALIBRATION OF PROBES AND THE LIKE

[75] Inventors: Geoffrey Fairbairn, Chesterton; George Frederick Cooke, Royston; Reginald Winkworth, Western in Gardano; Jan Koreki, Portishead, all of England

[73] Assignee: Techne(Cambridge) Limited, Duxford, England

[21] Appl. No.: 731,086

[22] Filed: Oct. 8, 1976

[51] Int. Cl.² ............................................. G01K 15/00
[52] U.S. Cl. ............................................. 73/1 F
[58] Field of Search ........................ 73/1 F; 165/104 F

[56] References Cited

U.S. PATENT DOCUMENTS

| | | | |
|---|---|---|---|
| 3,196,251 | 7/1965 | Bruyne | 165/104 F |
| 3,350,916 | 11/1967 | Staffin | 73/1 F |

Primary Examiner—S. Clement Swisher
Attorney, Agent, or Firm—William F. Frank

[57] ABSTRACT

A method of, and apparatus for, performing comparison calibrations of temperature sensors using a temperature controlled fluidized bath. The bath is operated such that prior to recording the indications of the temperature sensors the supply of fluidizing medium to, and the heat exchange with, the particulate material within the bath are simultaneously terminated. It has been found that when this procedure is adopted considerably better temperature stability is experienced in the bath than when fluidization is maintained throughout the entire period of calibration.

14 Claims, 6 Drawing Figures

METHOD FOR TEMPERATURE CALIBRATION OF PROBES AND THE LIKE

This invention relates to the comparison calibration of temperature sensors, which term includes thermocouples, resistance thermometers, thermistors, mercury-in-glass thermometers and the like, by the immersion of such sensors together with a reference temperature sensor in a temperature-controlled fluidised bath.

A fluidised bath comprises a vessel containing a body of particulate material, e.g., powdered alumina, to which a gaseous medium can be supplied in such manner that the individual particles of material are agitated in a manner somewhat resembling the motion of the molecules in a fluid. Accordingly, when in this state, which is hereinafter referred to as the "fluidized state," the overall body of material exhibits certain properties analogous to the characteristic properties of fluids, such as the rapid distribution of heat within the body by a process akin to diffusion.

Thus, fluidized baths equipped with a thermostatically controlled heat source, such as one or more electric immersion heaters, are widely used to provide an environment of controlled and easily variable temperature for the comparison calibration of temperature sensors. They are preferable to the liquid baths which are used for the same purpose by virtue of the greater range of temperatures which can be obtained with a fluidized bath and the fact that the temperature sensors cannot be corroded or even wetted by the material in a fluidized bath. However, the fluidized bath has one particular disadvantage which is that when the particulate material is in the fluidized state it is impossible even with the most sophisticated forms of thermostatic control, to maintain the temperature at a selected region within the fluidized material at a value with a short term stability much better than about ± 0.2° C. This is due to the inevitable temperature differential, however, small, which is required to operate the thermostatic means of control and, furthermore, however carefully the particulate material is prepared and however thoroughly it is fluidized there will always be slight non-uniformities in the material. Thus, it is inevitable that the temperature throughout fluidized material will never be completely uniform and, this being the case, then by virtue of the "diffusion" effect mentioned above these slight non-uniformities in temperature will give rise to temperature fluctuations at all points within the material.

Clearly, it is highly desirable, particularly when a large number of temperature sensors are to be calibrated together, that the temperature in the region of the bath where the sensors are located be held as constant as possible over the period of time necessary for the indication of each sensor to stabilise and be recorded. Whereas a fluctuation of ± 0.2° C is tolerable for the purposes of many calibrations, nevertheless a need does exist for some way of obtaining a considerably better temperature stability within a fluidized bath over a reasonably useful time period, and it is to the solution of this problem that the present invention is primarily directed.

In the past, it has been proposed to attenuate the temperature fluctuations experienced by the temperature sensors by embedding them in a body of high thermal capacity which is then placed in the fluidized bath. A body which has been used for this purpose is a receptacle containing the same particulate material as is used in the bath but which, however, is not fluidized. However, it will be appreciated that this procedure greatly increases the time taken for the temperature experienced by the sensors to reach and stabilize at any particular selected value, and largely defeats the object of employing a fluidized bath in the first place.

Underlying the present invention is the discovery that if, instead of endeavoring to maintain the particulate material at a constant temperature in the fluidized state when recording the indications of the sensors, the supply of fluidizing gas to, and the heat exchange with, the material are terminated substantially simultaneously before recording the indications, then the temperature of the material will stay at a considerably more constant value when the indications are subsequently recorded than is possible when fluidizaion is maintained. Tests have shown that, using a bath approximately 14 inches deep and 8 inches in diameter and at temperatures of up to 600° C, if this procedure is followed then it is easy to obtain a temperature at the center of the bath which will not fluctuate by more than 0.05° C for a period of 30 seconds or so as recorded by sensors of a time constant less than 0.5 seconds immersed directly in the alumina. If the sensors are embedded in a holder comprising a small aerodynamically profiled block of a metal of low thermal capacity and high thermal conductivity, such as aluminum bronze, the attenuating effect of this block may increase this time period to 8 minutes or so. The thermal capacity of such a block is, however, not so great as to increase the time taken for the temperature experienced by the sensors to reach a particular value to an extent anywhere near that which obtains with the high thermal capacity bodies mentioned above. With the apparatus hereinafter to be described with reference to the accompanying drawings, a temperature can easily be obtained at the center of the bath which will not fluctuate by more than 0.01° C for the period of time required to record the indications of the temperature sensors.

The benefits obtained by the procedure can be explained as follows. At the moment of terminating the supply of gas to the particulate material in the bath the overall body of material in effect undergoes a phase change from "fluid" to "solid." In other words it undergoes a change from a state in which heat is rapidly distributed throughout the body of material by "diffusion" to a state in which it suddenly acts as a massive insulator surrounding the temperature sensors and, by virtue of the previous fluidization, largely at a uniform temperature. However, as explained above, the temperature throughout the material will not be at an entirely uniform value at this stage but, as the material is now "solid" there is no "diffusion" taking place and so, once the temperature of the material surrounding the temperature sensors has been given sufficient time to stabilize by internal conduction, there is no reason for any substantial change to occur in the temperature experienced by the sensors until the immediately surrounding material begins to cool.

Thus, in its broadest aspect, the present invention resides in a method of calibrating a temperature sensor which comprises the steps of immersing said temperature sensor together with a reference temperature sensor in a body of particulate material; supplying a gaseous medium to said body of particulate material in such manner as to maintain the same in a fluidized state, whilst performing heat exchange with said body of particulate material; substantially simultaneously terminating the supply of gaseous medium to, and the heat exchange with, said body of particulate material after a selected value of the temperature of said material has been attained; and recording the indications of said temperature sensors whilst the supply of gaseous medium to, and the heat exchange with, said body of particulate material remains terminated. The invention also provides apparatus adapted for use in performing this method of calibration.

Further features of the invention will become apparent from a consideration of the following particular description, reference being made to the accompanying drawings. In the drawings.

Figure 1:
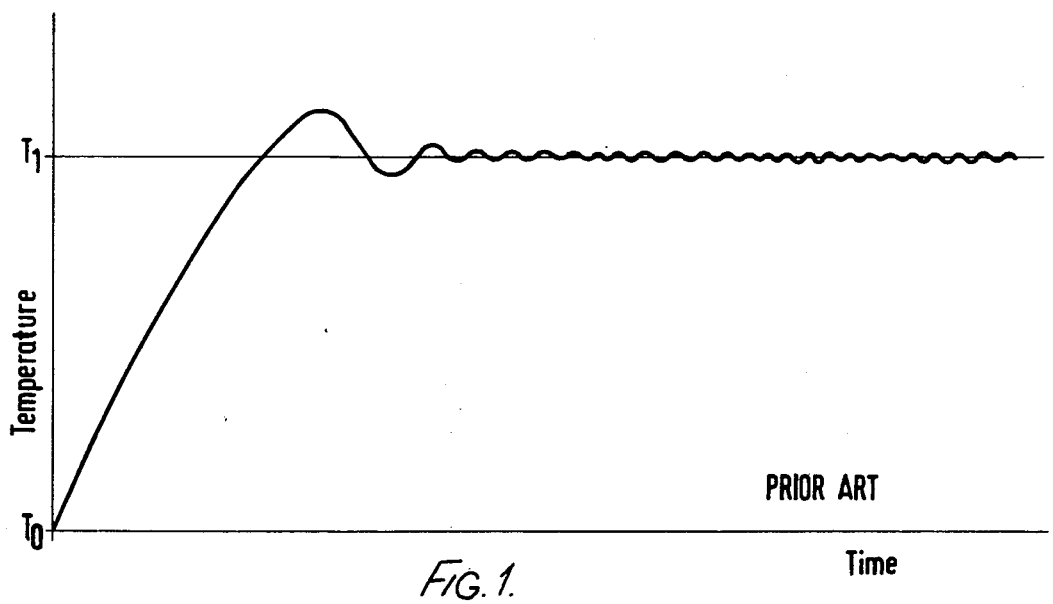
FIG. 1 is a curve of temperature versus time for a conventionally operated fluidized bath required to be raised from temperature $T_0$ to temperature $T_1$.

Referring first to FIG. 1, this shows a typical relationship of temperature versus time for the center of a conventional thermostatically controlled fluidized bath which is initially at ambient temperature $T_0$ and is desired to be brought up to temperature $T_1$, and in which fluidization is maintained throughout the entire illustrated time period. As shown by the Figure, the temperature never quite stabilizes, constantly fluctuating above and below the mean temperature $T_1$ by an amount which is unlikely to be less than 0.2° C.

Figure 2:
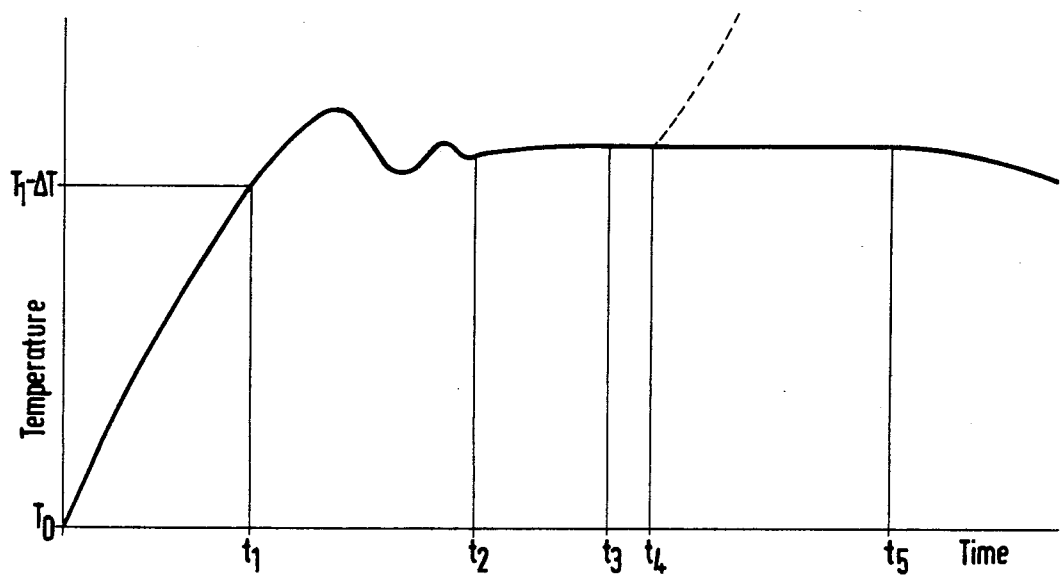
FIG. 2 is a similar curve for a fluidized bath operated in accordance with the principles of the present invention.

FIG. 2 shows the same relationship for the temperature experienced by a sensor located at the center of a fluidized bath operated in accordance with the present invention. With the material of the bath in the fluidized state the temperature rises from $T_0$ under thermostatic control as before, but as soon as it reaches the limit of stability possible under fluidization both the supply of fluidizing gas and the supply of heat to the bath are terminated; this point is designated in the Figure as occurring at time $t_2$. As the Figure indicates, the temperature fluctuations characteristic of the conventionally-controlled bath now cease. By time $t_3$ all heat transfer at the center of the bath has ceased, and the temperature remains substantially stable until time $t_5$ when the material surrounding the sensor begins to cool. Generally, a slight overall rise in temperature — in the order of 0.1° C — occurs in the period from $t_2$ to $t_3$ if the fluidizing gas is air initially at ambient temperature, as the slight cooling effect of this air is removed when fluidization ceases at $t_2$. For the set up to be described below, the period from $t_2$ to $t_3$ may typically be in the order of 3 minutes and the period from $t_3$ to $t_5$ in the order of 8 minutes.

Decription will now be directed to FIGS. 3 to 6 which illustrate details of a fully automated apparatus adapted to perform comparison calibrations of thermocouples in a fluidized bath at an ascending series of discrete temperature values.

Figure 3:
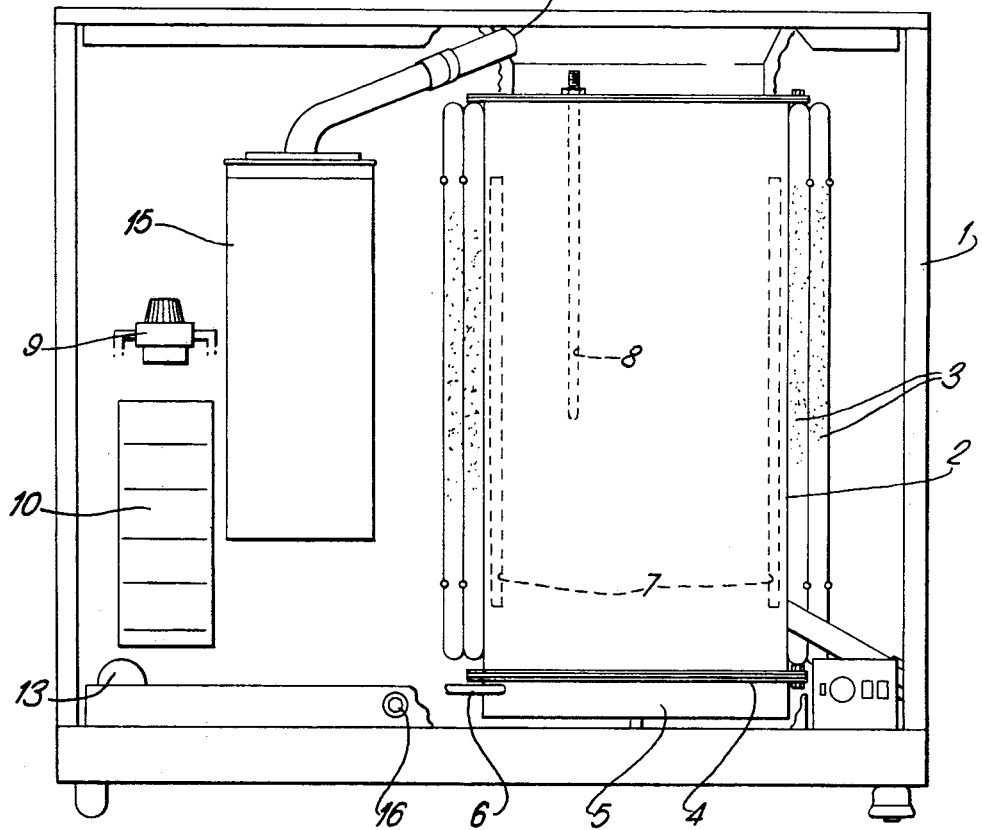
FIG. 3 shows, partly schematically, the interior layout of a unit housing a fluidized bath for use in the present invention.
Figure 4:
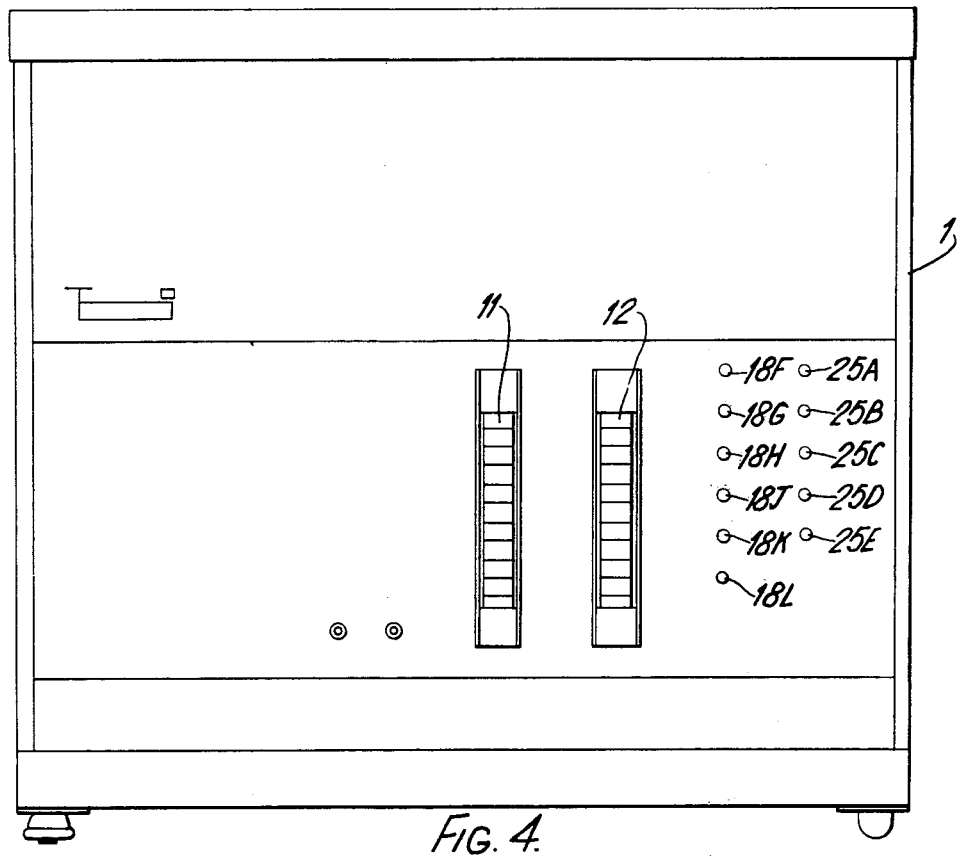
FIG. 4 is a rear elevation of the unit shown in FIG. 3.

Referring to FIGS. 3 and 4, the bath is located in a cabinet 1 and comprises an open-topped cylindrical vessel 2 of stainless steel, approximately 14 inches deep and 8 inches in diameter. Vessel 2 contains a body of powdered alumina in an amount such that it substantially fills the vessel when in the fluidized state. The vessel is surrounded by layers of thermal insulation 3, and at its base it is separated by a porous plate 4 from a plenum chamber 5 to which fluidizing air can be supplied via conduit 6. Situated around the inner periphery of the vessel are electric immersion heaters 7 and a platinum resistance temperature probe 8. The probe is situated directly in the alumina, close to a heater, i.e., in the region where the greatest temperature fluctuations will occur, and the signal produced by the probe is fed to a controller (to be described below) which in turn controls heaters 7 and the fluidizing air supply.

Also located within or upon the cabinet 1 are an air pressure regulator 9, a group of needle and solenoid valves 10, flowmeters 11 and 12 and pressure switch 13, all to be described below with reference to FIG. 5. Furthermore, a dust extraction unit is provided which comprises an air mover 14 which promotes a flow of air across the top of vessel 2 to capture any fine particles of alumina which may be discharged from the bath with the fluidizing air. Such particles are thereafter deposited in a removable fabric bag 15.

Figure 5:
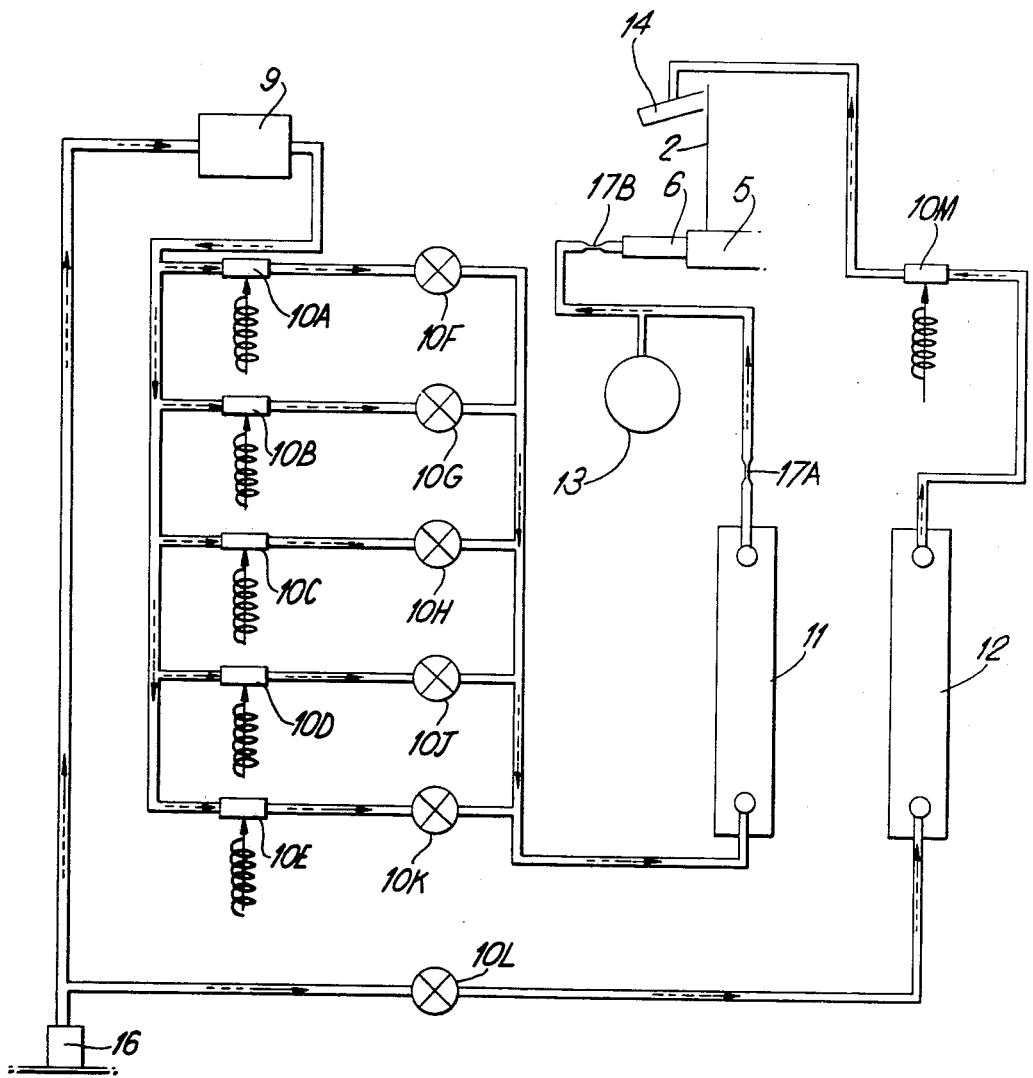
FIG. 5 is a piping diagram for the interior of the unit shown in FIGS. 3 and 4.

Referring now to FIG. 5, this shows the air piping arrangement within cabinet 1. Air is supplied to the cabinet at 16 from a regulated source at, say, 50 p.s.i. The inlet conduit bifurcates and separate lines lead to the plenum chamber 5 and air mover 14. Considering the first such line, the pressure is reduced to, say, 30 p.s.i., by regulator 9 and the air is directed to the group of solenoid and needle valves 10A to 10K. These valves are arranged in five parallel paths, with a solenoid valve and a needle valve arranged in series in each path. The needle valves 10F to 10K are set to permit respective mass flows of decreasing rates, the rate of flow reaching plenum chamber 5 at any particular time accordingly depending upon which of the five parallel paths is open, i.e., upon which of the group of solenoid valves 10A to 10E is open. The purpose of this arrangement is to enable the air flow to the bath to be adjusted in accordance with the temperature of the bath as will be more particularly explained hereinafter. Downstream of the valves is the flowmeter 11 to indicate the rate of flow delivered to the bath, and this is followed by the pressure switch 13 disposed between restrictions 17A and 17B, (of, say, 1mm and 1.3 mm diameter respectively), which acts to cut off electric power to the heaters 7 in the event of the failure of the air supply.

In the second (air mover) line there is disposed the needle valve 10L which is adjusted to permit the desired flow rate to the air mover, the flowmeter 12 to indicate such rate, and the solenoid valve 10M which acts as the on-off valve of this line. Access to the needle valves 10F to 10L is given at 18F to 18L (FIG. 4).

Figure 6:
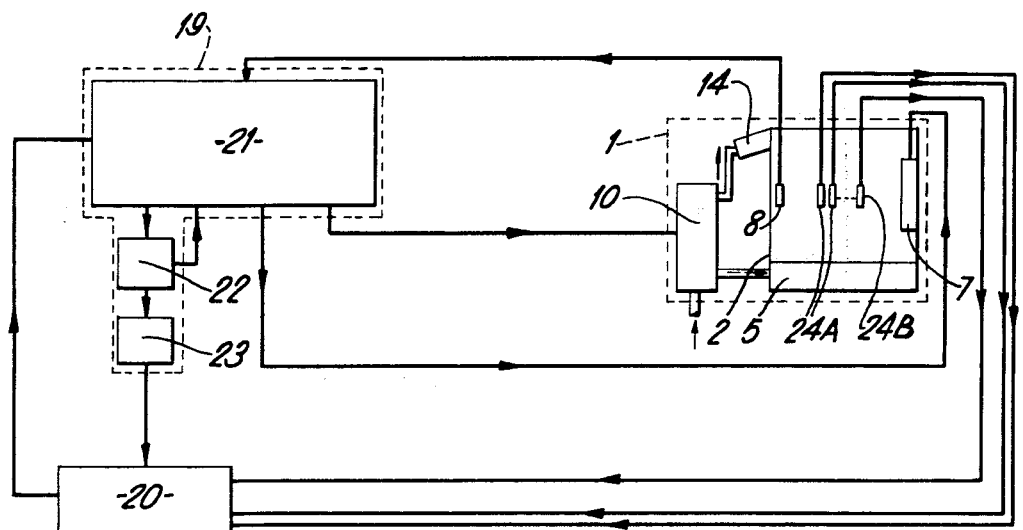
FIG. 6 shows schematically the layout of apparatus for performing automated calibrations according to the present invention.

Referring now to FIG. 6, there is illustrated in simplified form the entire atuomatic apparatus comprising the fluidized bath in cabinet 1, a controller 19 and an automatic data logger 20. The controller basically comprises logic circuitry 21 for the control of heaters 7 and the fluidizing air supply, and two timers 22 and 23.

The thermocouples 24A to be calibrated, (of which there may be, say, six), together with a reference thermocouple 24B, are mounted in the center of the bath and connected to an input of the data logger 20. The thermocouples are all implanted in a small aerodynamically profiled block of a metal of low thermal capacity and high thermal conductivity, e.g., aluminum bronze which is then suspended in the bath.

A "station change" inhibit circuit is incorporated in the automatic air unit. The reason for this is that if an air station change takes place during timing $t_1$, the transient temperature disturbance in the bath could upset the stabilization process, resulting in an unstable data logging sequence. The inhibit circuit (not shown) prevents any air station change during $t_1$.

In operation, the automatic sequence begins with controller 19 opening solenoid valve 10A to supply fluidizing air to the plenum chamber 5, opening solenoid valve 10M to supply air to the air mover 16, and switching on heaters 7. The signal produced by probe 8 is fed to logic circuitry 21 which in turn thermostatically controls the supply of power to heaters 7 in order to bring the temperature of the bath up to the preselected value at which the first calibration is to be made. Referring back to FIG. 2, if the temperature at which the first calibration is to be made is $T_1$, then when probe 8 first senses a temperature of $T_1 - \Delta T$ (where $\Delta T$ is in the order of 2° or 3° C), logic circuitry 21 sends a signal to initiate the first timer 22. This point is designated in FIG. 2 as occurring at time $t_1$. Timer 22 is preset to run for a period sufficient to allow the temperature in the bath to rech the limit of stability possible under fluidization, i.e., until time $t_2$; the period from $t_1$ to $t_2$ may typically be in the order of 8 minutes.

At time $t_2$ a signal is returned from timer 22 to logic circuitry 21 which thereupon closes valves 10A and 10M and simultaneously terminates the supply of power to heaters 7. At the same time a signal is fed from timer 22 to initiate timer 23. Timer 23 is preset to run for a period sufficient to allow any heat transfer in the now "solid" material at the center of the bath to cease, i.e., until time $t_3$. As mentioned previously, the period from $t_2$ to $t_3$ may typically be in the order of 3 minutes. At time $t_3$ a signal is fed from timer 23 to data logger 20 to initiate the logging sequence. At this point the temperature at the center of the bath is substantially stable and can remain that way until time $t_5$. However, a present day data logger requires only about 40 seconds in which to scan and record the indications of each of the thermocouples 24A and 24B, and so excellent temperature stability is ensured over this period; as mentioned previously, a temperature which will not fluctuate by more than 0.01° C can easily be obtained for this period.

The logging sequence finishes at time $t_4$ and at this point a signal is returned from data logger 20 to controller 19 which again switches on the heaters and air supply and acts to bring the temperature of the bath up to the preselected value at which the second calibration is to be made, (the beginning of this is shown in dashed line in FIG. 2). To this end, the controller may include a "Ledex" rotary stepping switch which steps by one position for each actuation by data logger 20 and thereby switches a series of individual circuits of different impedance values into logic circuitry 21 in turn. In this way, the controller is programmed to repeat the calibration sequence enumerated above with respect to temperature $T_1$ at an ascending series of discrete temperature values. These values may, for example be from 50° to 600° C at 25° C intervals. Provision may be made for varying the circuit component values within the controller in order to vary these temperature values within certain limits. Furthermore, means may be provided for programming the stepping switch so that calibrations will be made only at selected ones of the total possible number of temperature values, unselected values being by-passed by the switch.

As mentioned above the purpose of the five parallel paths shown in FIG. 5 for the supply of air to plenum chamber 5 is to enable the rate of flow delivered to the bath to be adjusted in accordance with the temperature of the bath. The degree of fluidization obtained in the bath largely depends upon the ratio of the volume of air passing through the bath to the volume of particulate material within the bath. Naturally, with the bath at elevated temperatures the air passing through the bath will rapidly heat up and expand, and the higher the temperature is in the bath the greater this expansion will be. Accordingly, in order to obtain optimum fluidization over the entire range of temperature at which the bath is operated, the air must be supplied at a higher mass flowrate when the bath is at lower temperatures and at a lower mass flowrate when the bath is at high temperatures, thus compensating for the different amounts of expansion in the bath at different temperatures.

Experiments have shown five different supply rates to be sufficient for the described embodiment when operated over the temperature range of from ambient to 600° C. Thus, throughout the fluidized phases of operation of the bath, air is supplied by the opening of one or other of solenoid valves 10A to 10E, the opening of the valves being controlled by logic circuitry 21 in response to the signal provided by probe 8. For example, at bath temperatures below 75° C valve 10A is opened to permit the greatest of the possible flowrates; between 75° and 150° C valve 10B is opened; between 150° and 250° C valve 10C is opened; between 250° and 400° C valve 10D is opened; and above 400° C valve 10E is opened to permit the least of the possible flowrates. At the end of the entire sequence of calibrations the heaters 7 remain switched off, airflow being maintained to assist cooling down of the bath, the sequence of opening of the solenoid valves being reversed as the cooling takes place. Indicators 25A to 25E are provided on cabinet 1 (FIG. 4) to show which, if any, of valves 10A to 10E are open at any particular time.

Whereas the invention has been described above with respect to one specific embodiment thereof, various modifications may occur to those skilled in the art without departing from the scope of the invention as defined in the appended claims. In particular, although the invention has been described in terms of its application to a fluidizing bath which is operated at above-ambient temperatures, i.e., one in which a "positive" heat exchange is performed with the particulate material in the bath, nevertheless it is equally applicable to a bath which is operated at sub-ambient temperatures. In such a case, the necessary "negative" heat exchange with the particulate material in the bath (i.e., the withdrawal of heat therefrom), can be effected e.g., by using as the fluidizing medium nitrogen vapor obtained from a source of liquid nitrogen; in this way the temperature of the bath can be brought down almost to the boiling point of nitrogen at atmospheric pressure, i.e., to the region of −190° C.

The bath unit also incorporates an overheat safety cut-out system, set to trip at approximately 680° C. There is a time delay between removal of power from the bath and the relay operation in order to cope with transient power failures. The system (not shown) is wired in a "manual reset" mode, the reset button being on the front panel of the bath unit. A "cutout" condition is indicated by a red lamp on the front panel.

What is claimed is:

1. A method for calibrating at least one temperature sensor in a fluidized bath, comprising the steps of:
   embedding said to-be-calibrated at least one sensor and a reference temperature sensor in a medium having low thermal capacity and high thermal conductivity; placing said embedded sensors and said medium within a mass of confined particulate material which is in an at least partial fluidized state;
   subjecting said mass for a predetermined period of time to a controlled rate of flow of a gaseous medium to establish and maintain said mass in a fluidized state while simultaneously the said gaseous medium is performing heat exchange with said particulate material until a first selected value of temperature of said particulate material has been attained, the rate of flow of said medium being maintained constant and the rate of flow being according to the temperature developed in the heat exchange to compensate for thermal expansion of said gaseous medium in order to maintain said fluidized bath at a substantially constant level;
   increasing the heat exchange between said gaseous medium and said material while changing the rate of flow according to the temperature of the gaseous medium for said thermal expansion compensation until a second temperature value of said material is attained, said second temperature value being a predetermined incremental change from said first temperature value, said second value being that at which said calibration is to be made;
   simultaneously terminating the rate of flow of said gaseous medium to, and heat exchange with, said particulate material to change said material from a fluidized state to a quiescent state for a predetermined period of time to complete heat exchange transfer between said material and said embedding medium until the temperature of said embedding medium surrounding said sensors becomes substantially stabilized at said second temperature value;
   recording the indications of said temperature sensors while the supply of gaseous medium to, and the heat exchange with, said particulate material remains terminated and said second temperature value is stabilized.

2. The method according to claim 1 wherein said third, fourth, fifth and sixth mentioned steps are subsequently repeated a plurality of times, said selected values of the first and second temperatures of said particulate material being greater on each occasion.

3. The method according to claim 1 wherein said temperature values are above ambient.

4. The method according to claim 1 wherein said temperature values are sub-ambient.

5. A method of calibrating a test temperature sensor comprising the steps of:
   immersing said test temperature sensor together with a reference temperature sensor in a body of particulate material;
   supplying a gaseous medium to said body of particulate material in such manner as to maintain the same in a fluidized state;
   performing heat exchange under control of thermostat means with said body of particulate material while maintained in said fluidized state in such manner that the temperature of said body of particulate material changes progressively until it reaches a preselected temperature range and is thereafter maintained thermostatically within said range;
   initiating timing by timing means of a first predetermined period of time in response to the temperature of said body of particulate material substantially reaching preselected temperature range;
   in response to expiry of said first period of time, terminating the supply of gaseous medium to, and the heat exchange with, said body of particulate material, and initiating timing by timing means a second predetermined period of time, all substantially simultaneously; and
   in response to expiry of said second period of time recording the indication of each of said temperature sensors while the supply of gaseous medium to, and the heat exchange with, said body of particulate material remain terminated;
   whereby the temperature of said body of particulate material is substantially stable at a single value during the recording of the indications of both temperature sensors.

6. A method of calibrating a temperature sensor according to claim 4 and further comprising the step of setting said thermostat means to a mean temperature within said range
   wherein said heat exchange is performed by means of a heat source immersed in the body of particulate material;
   and wherein the initiating of timing of said first predetermined period of time is in response to the temperature of said body of particulate material reaching a preselected value which is reached before the mean temperature is reached.

7. A method of calibrating a temperature sensor according to claim 5 wherein said second predetermined period of time is of such length that by its expiry the temperature of the material surrounding said temperature sensors is at a substantially stable value.

8. A method of calibrating a temperature sensor according to claim 6 wherein the rate of mass flow of said gaseous medium which is supplied to said body of particulate material is reduced as the temperature of said particulate material increases.

9. Apparatus for use in calibrating a temperature sensor comprising:
   a body of particulate material wherein said temperature sensor can be immersed together with a reference temperature sensor;
   means for supplying a gaseous medium to said body of particulate material in such manner as to maintain the same in a fluidized state and means for simultaneously performing heat exchange with said body of particulate material;
   means for sensing the temperature of said particulate material independently of the temperature sensor to be calibrated;
   a first timer arranged to run for a first predetermined period of time and to be initiated when a signal representing a selected value of the temperature of said material is produced by said last-mentioned sensing means;
   means arranged to substantially simultaneously terminate the supply of gaseous medium to, and the heat exchange with, said body of particulate material upon the expiry of said first predetermined period of time;

a second timer arranged to run for a second predetermined period of time and to be initiated upon the expiry of said first predetermined period of time; and means to control the supply of gaseous medium during said first predetermined period of time.

10. Apparatus according to claim 9 further comprising means for recording the indications of the reference temperature sensor and the temperature sensor to be calibrated upon the expiry of said second predetermined period of time.

11. Apparatus according to claim 9 wherein:
said means for performing heat exchange comprises a thermostatically controlled heat source immersed in the body of particulate material;
said selected value of the temperature of said material is less than the mean temperature value which said heat source is adapted to establish in said material under said thermostatic control; and
said first predetermined period of time is of such length that by its expiry said mean temperature value has been established.

12. Apparatus according to claim 11 wherein said second predetermined period of time is of such length that by its expiry the temperature of the material surrounding said temperature sensors is at a substantially stable value.

13. Apparatus for use in calibrating a temperature sensor comprising:
a body of particulate material wherein said temperature sensor can be immersed together with a reference temperature sensor;
a source of gaseous medium under pressure;
conduit means leading from said source to said body of particulate material for supplying said gaseous medium to said body of particulate material so as to maintain the same in a fluidized state;
valve means for permitting and terminating said supply of gaseous medium to said body of particulate material;
an electrically operated heat source immersed in said body of particulate material;
means for recording the indications of the reference temperature sensor and the temperature sensor to be calibrated;
means for controlling the operation of said valve means, the supply of electrical power to said heat source and the operation of said recording means; and means for sensing the temperature of said particulate material independently of the temperature sensor to be calibrated, the signal representing the temperature sensed thereby being fed to said control means;
said control means being so arranged as to substantially simultaneously close said valve means and terminate the supply of electrical power to said heat source after a signal representing a selected value of the temperature of said particulate material has been received from the last-mentioned sensing means, and to thereafter operate said recording means to record the indications of the reference temperature sensor and the temperature sensors to be calibrated;
said conduit means comrpises a plurality of conduits arranged in parallel, each of which can supply said gaseous medium to said body of particulate material at a different rate of mass flow;
said valve means comprises a plurality of valves, one disposed in each said conduit; and
said control means is so arranged as to open only one of said valves at a time, the choice of valve to be opened depending upon the signal received by said control means from the last-mentioned sensing means, whereby different rates of mass flow of said medium are supplied to said body of particulate material at different values of the temperature of said material.

14. Apparatus according to claim 13 wherein said control means is so arranged as to open said valve means and to re-start the supply of electfical power to said heat source after said indications have been recorded by said recording means; to simultaneously close said valve means and terminate the supply of electrical power to said heat source after a signal representing a selected value of the temperature of said particulate material higher than said first-mentioned selected value has been received from the said recording means; and thereafter to operate said recording means to record the indications of the reference temperature sensor and the temperature sensor to be calibrated.

* * * * *